(12) United States Patent
Cho et al.

(10) Patent No.: US 8,285,416 B2
(45) Date of Patent: Oct. 9, 2012

(54) SYSTEM AND METHOD FOR STABILIZATION CONTROL ADOPTING VESTIBULO-OCULAR REFLEX

(75) Inventors: Dong-il Cho, Seoul (KR); Hyoungho Ko, Seoul (KR); Jaehong Park, Seoul (KR); Sangmin Lee, Seoul (KR)

(73) Assignee: SNU R&DB Foundation, Seoul (KR)

( * ) Notice: Subject to any disclaimer, the term of this patent is extended or adjusted under 35 U.S.C. 154(b) by 613 days.

(21) Appl. No.: 12/370,077

(22) Filed: Feb. 12, 2009

(65) Prior Publication Data

US 2010/0106295 A1 Apr. 29, 2010

(30) Foreign Application Priority Data

Oct. 28, 2008 (KR) ........................ 10-2008-0106002

(51) Int. Cl.
*G06F 19/00* (2011.01)
(52) U.S. Cl. .................. 700/245; 700/259; 382/153
(58) Field of Classification Search ................. 700/245, 700/259; 382/153
See application file for complete search history.

(56) References Cited

U.S. PATENT DOCUMENTS

| | | | | |
|---|---|---|---|---|
| 4,818,858 A | * | 4/1989 | Sorimachi et al. | 250/203.2 |
| 5,984,475 A | * | 11/1999 | Galiana et al. | 351/209 |
| 6,507,359 B1 | * | 1/2003 | Muramoto et al. | 348/47 |
| 2004/0190863 A1 | * | 9/2004 | Nishimura et al. | 386/46 |
| 2005/0185945 A1 | * | 8/2005 | Zhang et al. | 396/73 |

OTHER PUBLICATIONS

Xiaolin Zhang and Hidetoshi Wakamatsu, "A Robot-Eye Control System Based on Binocular Motor Mechanism", This study was presented in part in proceedings of the 15th symposium on Biological and Physiological Engineering, sponsored by SICE, Japan, in 2000. The authors are with the Faculty of Medicine, Tokyo Medical and Dental University.*

Ravi Kaushik, Marek Marcinkiewicz, Jizhong Xiao, Simon Parsons, and Theodore Raphan Implementation of Bio-Inspired Vestibulo-Ocular Reflex in a Quadrupedal Robot Manuscript. This work was supported in part by the National Science Foundation MRI Grant CNS-0520989NSF; National Institutes of Health under Grants DC05222, DC0.*

Xiaolin Zhang, An Object Tracking System Based on Human Neural Pathways of Binocular Motor System 1-4244-0342-1/06/$20.00 © 2006 IEEE.*

Article—A Robot-Eye Control System Based on Binocular Motor Mechanism (www.tmd.ac.JP/med/mtec/wakamatsu/research/eye/research/eyeel.pdf.2004.0831).

Office Action dated Nov. 30, 2010 corresponding to the Korean Patent Application No. 10-2008-0106002 (w/translation).

* cited by examiner

*Primary Examiner* — James Trammell
*Assistant Examiner* — Truc M Do
(74) *Attorney, Agent, or Firm* — Ohlandt, Greeley, Ruggiero & Perle, L.L.P.

(57) ABSTRACT

A system and a method for stabilization control may control position and direction of an object having first and second bodies connected to each other. The system may include an artificial vestibular apparatus for outputting a movement signal corresponding to movement of the first body and a rotation signal corresponding to rotation of the first body; a translating actuation unit connected between the first and second bodies and controlling position of the second body in response to the movement signal; and a rotating actuation unit connected between the first and second bodies and controlling rotation of the second body in response to the rotation signal. If the system and the method are applied to a vision system of a mobile robot, the vision system may obtain stabile image information even when the mobile robot is moving. Thus, it is possible to prevent any blurring from occurring at the image information.

7 Claims, 3 Drawing Sheets

SYSTEM AND METHOD FOR STABILIZATION CONTROL ADOPTING VESTIBULO-OCULAR REFLEX

CROSS-REFERENCE TO RELATED APPLICATION

This application claims priority to Korean Patent Application No. 10-2008-106002, filed on Oct. 28, 2008, and all the benefits accruing therefrom under 35 U.S.C. §119, the contents of which in its entirety are herein incorporated by reference.

BACKGROUND

1. Field

Exemplary embodiments relate to a system and a method for stabilization control adopting vestibulo-ocular reflex (VOR), and more particularly to a system and a method for stabilization control, which generate a signal corresponding to movement or rotation of a moving object such as a mobile robot using an artificial vestibular apparatus reproducing VOR of a living body, and stably control a predetermined portion of the object in response to the generated signal.

2. Description of the Related Art

Mobile robots are widely used for various works such as unmanned guard replacing humans. For such a mobile robot to accomplish a work, the robot should have a driving unit which allows the robot to move or rotate. Also, a vision system for obtaining image signals from outside is one of the essential functions of the mobile robot such that the mobile robot may recognize or trace a specific object.

However, since the driving unit and the vision system are connected to the same body, a target to be recognized by the vision system may deviate from an input range of the vision system if the driving unit makes a rotation or a portion where the vision system is positioned is rotated. In addition, even when a target does not deviate, blurring may occur in the image signal obtained by the vision system, which deteriorates an object recognition rate and accuracy of the vision system.

SUMMARY

According to exemplary embodiments, there are provided a system and a method for stabilization control, which may maintain position and direction of a specific portion of a moving object, such as a mobile robot, even if the mobile robot is vibrated or rotated.

According to an exemplary embodiment, there is provided a system for stabilization control, which controls position and direction of an object having first and second bodies connected to each other, the system including an artificial vestibular apparatus for outputting a movement signal corresponding to movement of the first body and a rotation signal corresponding to rotation of the first body; a translating actuation unit connected between the first and second bodies and controlling position of the second body in response to the movement signal; and a rotating actuation unit connected between the first and second bodies and controlling rotation of the second body in response to the rotation signal.

According to another exemplary embodiment, there is provided a method for stabilization control, which controls position and direction of an object having first and second bodies connected to each other, the method including outputting a movement signal corresponding to movement of the first body and a rotation signal corresponding to rotation of the first body; controlling position of the second body in response to the movement signal; and controlling rotation of the second body in response to the rotation signal.

Using the system and method for stabilization control, when a moving object such as an artificial robot is vibrated or rotated, a specific portion of the object may maintain its position and direction constantly. If the system and method for stabilization control are applied to a vision system of a mobile robot, the vision system may obtain stabile image information even when the mobile robot is moving, thereby preventing any blurring from occurring at the image information.

BRIEF DESCRIPTION OF THE DRAWINGS

The above and other aspects, features and advantages of the disclosed exemplary embodiments will be more apparent from the following detailed description taken in conjunction with the accompanying drawings in which.

DETAILED DESCRIPTION

Figure 1:
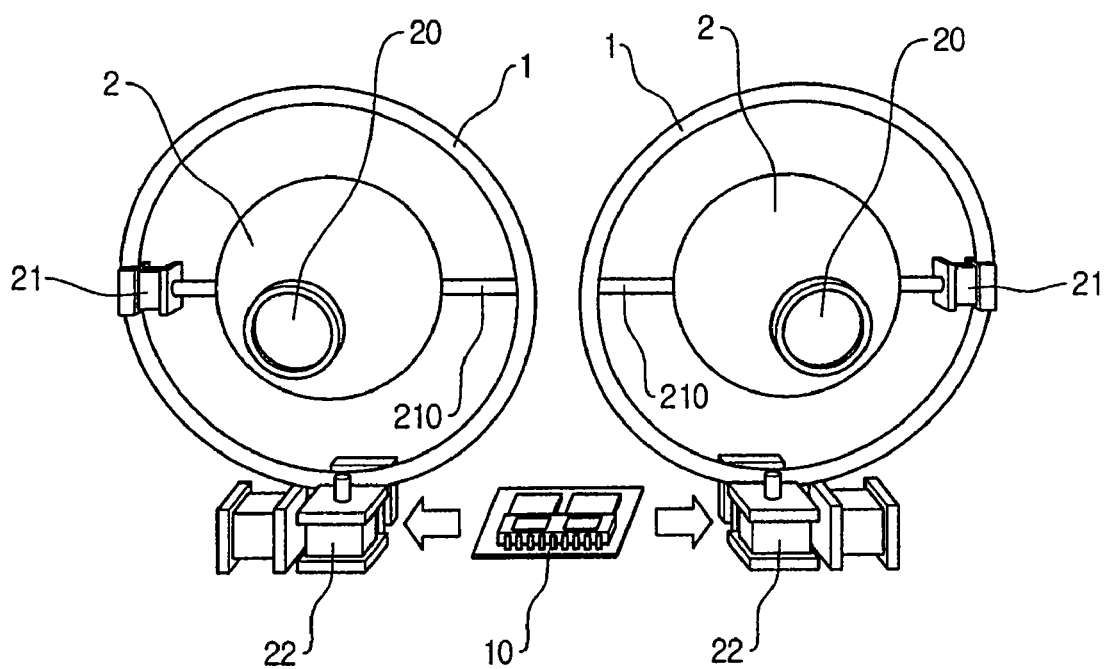
FIG. 1 shows an object to which an exemplary embodiment of a system for stabilization control is applied.

Exemplary embodiments now will be described more fully hereinafter with reference to the accompanying drawings, in which exemplary embodiments are shown. This disclosure may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first", "second", and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

In the drawings, like reference numerals in the drawings denote like elements. The shape, size and regions, and the like, of the drawing may be exaggerated for clarity.

Exemplary embodiment of a system and a method for stabilization control may control a moving object such as a mobile robot by adopting vestibulo-ocular reflex (VOR) such that a specific portion of the object may maintain its position and direction constantly even when the entire object is vibrated or rotated.

The VOR is one of the visual operations essential to a living body. The VOR is a reflex eye movement which stabilizes images of an object while the living body is moving. The VOR maintains the images from outside on the retina as long as possible during head movement by producing an eye movement in the direction opposite to head movement.

Exemplary embodiments of a system and a method for stabilization control may apply VOR to mobile robots such that a specific portion of the mobile robot is moved in a direction opposite to a moving direction in which the mobile robot is entirely or partially moved. For example, the system and method for stabilization control may control a vision system to which visual information is input to the mobile robot such that the visual information received by the mobile robot may be stabilized.

Hereinafter, exemplary embodiments of the system and method for stabilization control are explained in detail with reference to the accompanying drawings.

FIG. 1 is a front view showing an object to which an exemplary embodiment of a system for stabilization control is applied.

Referring to FIG. 1, the system for stabilization control is used for controlling position and direction of an object having a first body (not shown) and a second body 2, connected to each other. In FIG. 1, the first body corresponds to a head portion of a mobile robot, and the second body 2 corresponds to an eye portion connected to the head portion.

In FIG. 1, the second body 2 is connected to the first body via a circular connector 1, but it is just an example. In other exemplary embodiments, the second body 2 may be directly connected to the first body or connected to the first body via a differently shaped member. In case the mobile robot makes a movement or rotation, the head portion of the mobile robot (i.e. the first body) is moved, so the second body 2 connected to the first body is moved or rotated along with the mobile robot.

Figure 2:
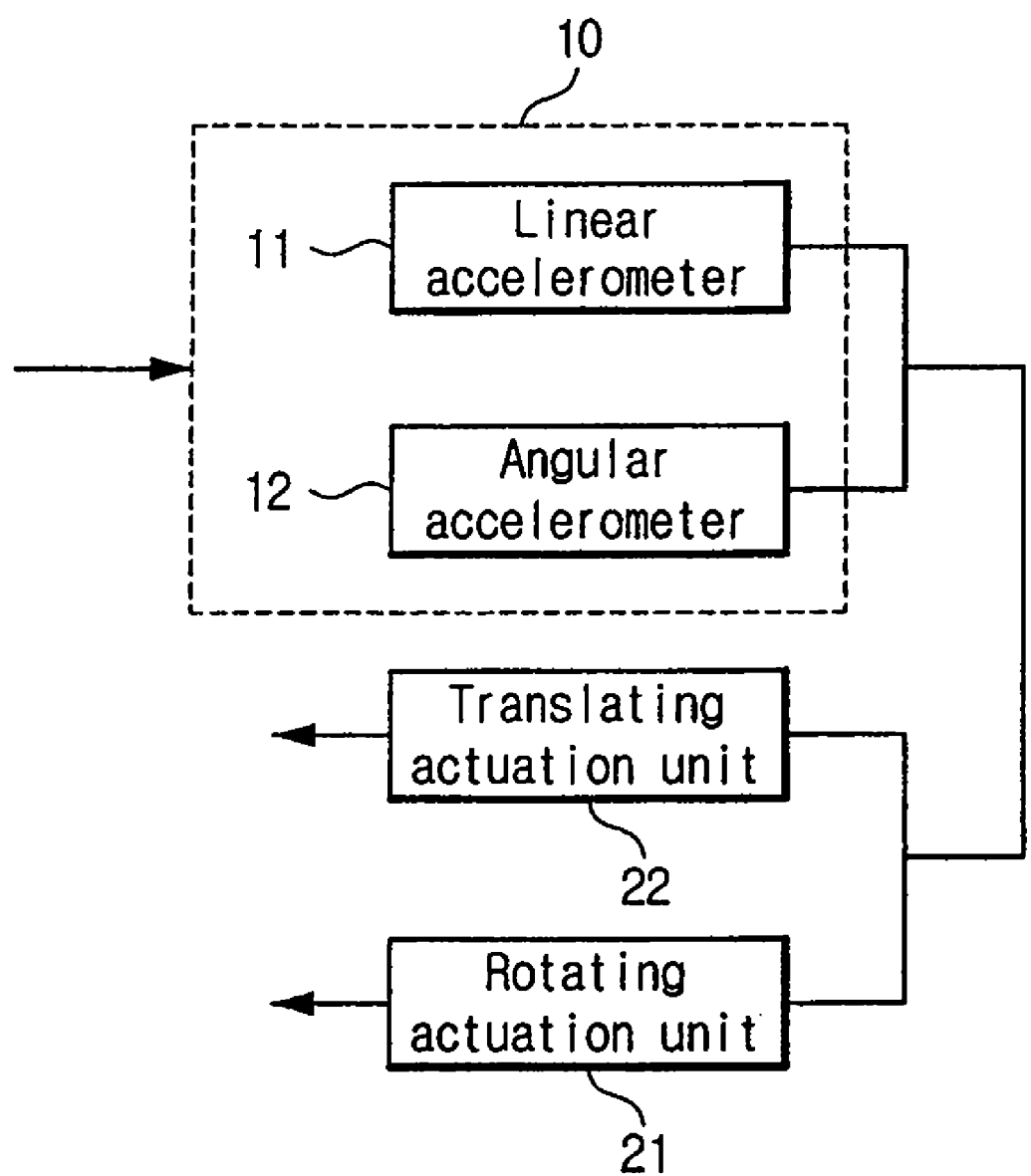
FIG. 2 is a block diagram showing an exemplary embodiment of a system for stabilization control.

FIG. 2 is a block diagram showing an exemplary embodiment of a system for stabilization control.

Referring to FIGS. 1 and 2, the system for stabilization control includes an artificial vestibular apparatus 10, a translating actuation unit 22 and a rotating actuation unit 21.

The artificial vestibular apparatus 10 detects a signal corresponding to movement or rotation of the head portion of the artificial robot, which is the first body. In an exemplary embodiment, the artificial vestibular apparatus 10 may include a linear accelerometer 11 for detecting movement of the first body and an angular accelerometer 12 for detecting rotation of the first body.

The linear accelerometer 11 detects linear acceleration caused by movement of the first body in at least one axial direction. In an exemplary embodiment, the linear accelerometer 11 may be configured as a three-axial linear accelerometer which detects linear accelerations in three axial directions. Alternatively, in another exemplary embodiment, the linear accelerometer 11 may include one or more linear accelerometers which detect linear accelerations in different axial directions.

Meanwhile, the angular accelerometer 12 detects angular acceleration caused by rotation of the first body with respect to at least one axial direction. In an exemplary embodiment, the angular accelerometer 12 may be configured as a three-axial angular accelerometer which detects angular acceleration with respect to three axial directions. Alternatively, in another exemplary embodiment, the angular accelerometer 12 may include one or more angular accelerometers which detect angular accelerations in different axial directions.

The artificial vestibular apparatus 10 detects a movement signal corresponding to movement of the first body and a rotation signal corresponding to rotation of the first body using the linear accelerometer 11 and the angular accelerometer 12. The detected signals are respectively transmitted to the translating actuation unit 22 and the rotating actuation unit 21 for the control of the second body 2.

The translating actuation unit 22 feeds the movement signal of the first body, transmitted from the artificial vestibular apparatus 10, back to the second body 2 to control position of the second body 2. In other words, if a signal indicating that the first body is moved in a specific direction is transmitted to the translating actuation unit 22, the translating actuation unit 22 moves the second body 2 in a direction which decreases the effect caused by the movement of the first body, e.g., in a direction opposite to the moving direction of the first body.

The translating actuation unit 22 may be configured to move the second body in an arbitrary direction in space including forward/backward, right/left and upward/downward directions. Due to negative feedback of the translating actuation unit 22, the position of the second body 2 may be constantly maintained without being influenced by movement or vibration of the first body.

In FIG. 1, the translating actuation unit 22 is connected to a connector 1 which connects the second body 2 to the first body. That is, the translating actuation unit 22 is configured to control the position of the second body 2 indirectly. However, it is just an example, and the translating actuation unit 22 may be directly connected to the second body 2 or configured to control position of the second body 2 using differently shaped devices.

Meanwhile, the rotating actuation unit 21 feeds the rotation signal of the first body, transmitted from the artificial vestibular apparatus 10, back to the second body 2 to control rotation of the second body 2. In other words, if a signal indicating that the first body is rotated in a specific direction is transmitted to the rotating actuation unit 21, the rotating actuation unit 21 rotates the second body 2 in a direction which decreases the effect caused by the rotation of the first body, e.g., in a direction opposite to the rotating direction of the first body.

Referring to FIG. 1, the rotating actuation unit 21 may include a rotary shaft 210 connected to the second body 2 so as to perform the aforementioned negative feedback. By rotating the second body 2 in a direction opposite to a rotating direction of the first body using the rotary shaft 210, the direction of the second body 2 may be constantly maintained without being influenced by the rotation of the first body.

In FIG. 1, the rotating actuation unit 21 includes one rotary shaft 210, but it is just an example. The rotating actuation unit 21 may control a direction of the second body 2 using a plurality of rotary shafts.

Also, in FIG. 1, the second body 2 includes a device 20 for receiving image information from the outside. In an exemplary embodiment, the second body 2 corresponds to an eyeball portion of a mobile robot, and it includes a device corresponding to an eye of the mobile robot, which receives image information from the outside.

In this case, if position and direction of the second body 2 are controlled using the system for stabilization control, even when the first body (i.e. a head portion of a mobile robot) is moved, the second body 2 constantly maintains its position and direction. Thus, the image information received by the second body 2 may have improved stability, and it is possible to prevent any blurring from occurring at the received image information.

In FIG. 1, the second body 2 corresponds to an eyeball portion of a mobile robot, but it is just an example. In other embodiments, the second body 2 may be any other part of an object. Also, any portion having a function other than receiving image information may be set as the second body 2 when the system for stabilization control is applied.

Figure 3:
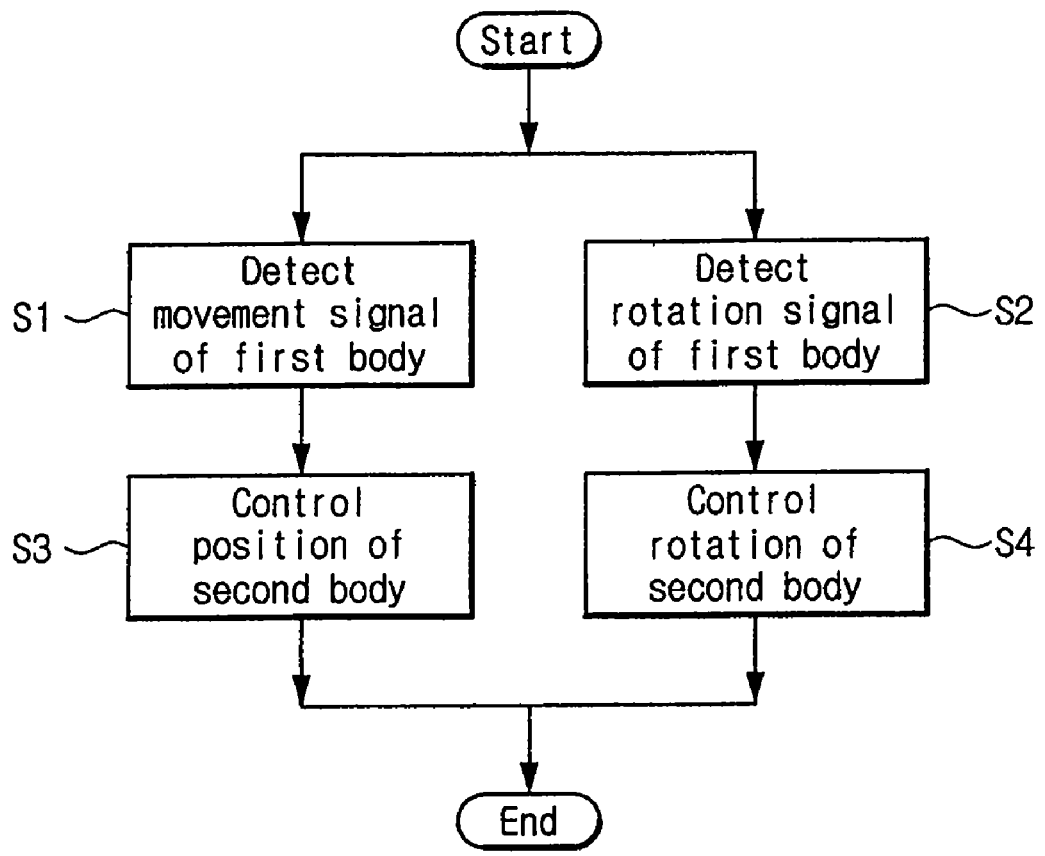
FIG. 3 is a flowchart illustrating an exemplary embodiment of a method for stabilization control.

FIG. 3 is a flowchart illustrating an exemplary embodiment of a method for stabilization control.

For the convenience, the method for stabilization control is explained with reference to FIGS. 2 and 3. The method for stabilization control starts from a process S1 for the artificial vestibular apparatus 10 to detect a movement signal generated by movement of the first body and a process S2 for the artificial vestibular apparatus 10 to detect a rotation signal generated by rotation of the first body.

The movement signal and the rotation signal of the first body, detected by the artificial vestibular apparatus 10, are transmitted to the translating actuation unit 22 and the rotating actuation unit 21, respectively. Then, the translating actuation unit 22 controls position of the second body connected to the first body in response to the transmitted movement signal (S3), and the rotating actuation unit 21 controls rotation of the second body in response to the transmitted rotation signal (S4).

For example, in an exemplary embodiment, the translating actuation unit 22 may be configured to move the second body in a direction opposite to a moving direction of the first body, and the rotating actuation unit 21 may be configured to move the second body in a direction opposite to a rotating direction of the first body. In this case, the position and direction of the second body may be constantly maintained without being influenced by movement or rotation of the first body.

Using the system and method for stabilization control, while an object such as a mobile robot is moved due to vibration, rotation or the like, a specific portion of the object may maintain its position and direction constantly by means of an artificial vestibular apparatus which mimics VOR.

Also, if the system and method for stabilization control are applied to a vision system of a mobile robot, the vision system may be controlled to obtain stabile image information even when the mobile robot is moving. As a result, it is possible to prevent any blurring from occurring at the image information received by the mobile robot.

While the exemplary embodiments have been shown and described, it will be understood by those skilled in the art that various changes in form and details may be made thereto without departing from the spirit and scope of this disclosure as defined by the appended claims.

In addition, many modifications can be made to adapt a particular situation or material to the teachings of this disclosure without departing from the essential scope thereof. Therefore, it is intended that this disclosure not be limited to the particular exemplary embodiments disclosed as the best mode contemplated for carrying out this disclosure, but that this disclosure will include all embodiments falling within the scope of the appended claims.

What is claimed is:

1. A system for stabilization control, which controls position and direction of an object having a first body which is mobile and a second body, the system comprising:
    an artificial vestibular apparatus for outputting a movement signal corresponding to movement of the first body in a plurality of axial directions and a rotation signal corresponding to rotation of the first body in the plurality of axial directions;
    a circular connector for connecting the second body to the first body;
    a translating actuation unit connected to the circular connector and controlling position of the second body in response to the movement signal by moving the circular connector horizontally and vertically; and
    a rotating actuation unit connected to the circular connector and comprising a plurality of rotary shafts connected to the second body, wherein the second body is connected to the circular connector by means of the plurality of rotary shafts, and wherein the rotating actuation unit controls rotation of the second body in response to the rotation signal by rotating the plurality of rotary shafts.

2. The system according to claim 1, wherein the artificial vestibular apparatus includes:
    a linear accelerometer for detecting linear acceleration of the first body in the plurality of axial directions; and
    an angular accelerometer for detecting angular acceleration of the first body in the plurality of axial directions.

3. The system according to claim 1, wherein the second body includes a device for receiving image information.

4. The system according to claim 1, wherein
    the translating actuation unit moves the second body in a direction opposite to a moving direction of the first body, detected from the movement signal, and
    the rotating actuation unit rotates the second body in a direction opposite to a rotating direction of the first body, detected from the rotation signal.

5. A method for stabilization control, which controls position and direction of an object having a first body which is mobile and a second body connected to a plurality of rotary shafts, the method comprising:
    outputting a movement signal corresponding to movement of the first body in a plurality of axial directions and a rotation signal corresponding to rotation of the first body in the plurality of axial directions;
    controlling position of the second body in response to the movement signal by moving a circular connector for connecting the second body to the first body horizontally and vertically, wherein the second body is connected to the circular connector through the plurality of rotary shafts; and
    controlling rotation of the second body in response to the rotation signal by rotating the plurality of rotary shafts.

6. The method according to claim 5, wherein controlling position of the second body includes:
    moving the second body in a direction opposite to a moving direction of the first body, detected from the movement signal.

7. The method according to claim 5, wherein controlling rotation of the second body includes:
    rotating the second body in a direction opposite to a rotating direction of the first body, detected from the rotation signal.

* * * * *